July 7, 1953
R. A. BLUNT
2,644,599
BOTTLE
Filed April 24, 1951
2 Sheets-Sheet 2
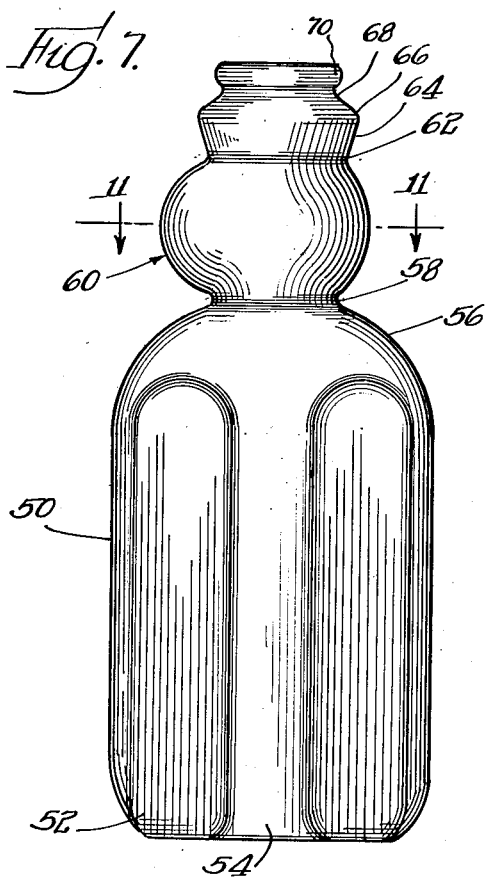
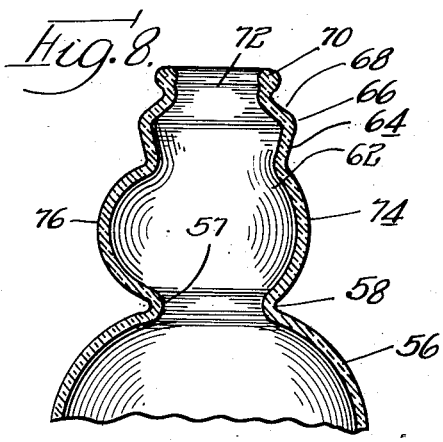
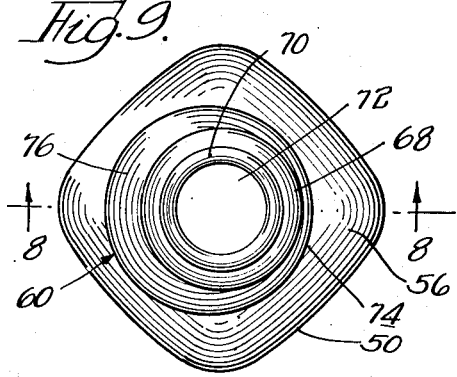
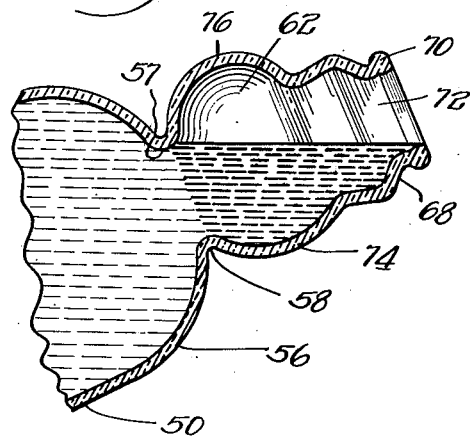
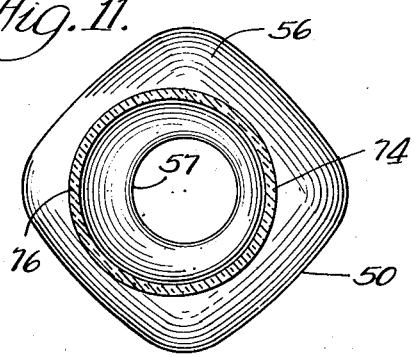
INVENTOR.
*Royden A. Blunt*
BY
*Moore, Olson & Trexler*
Attys.

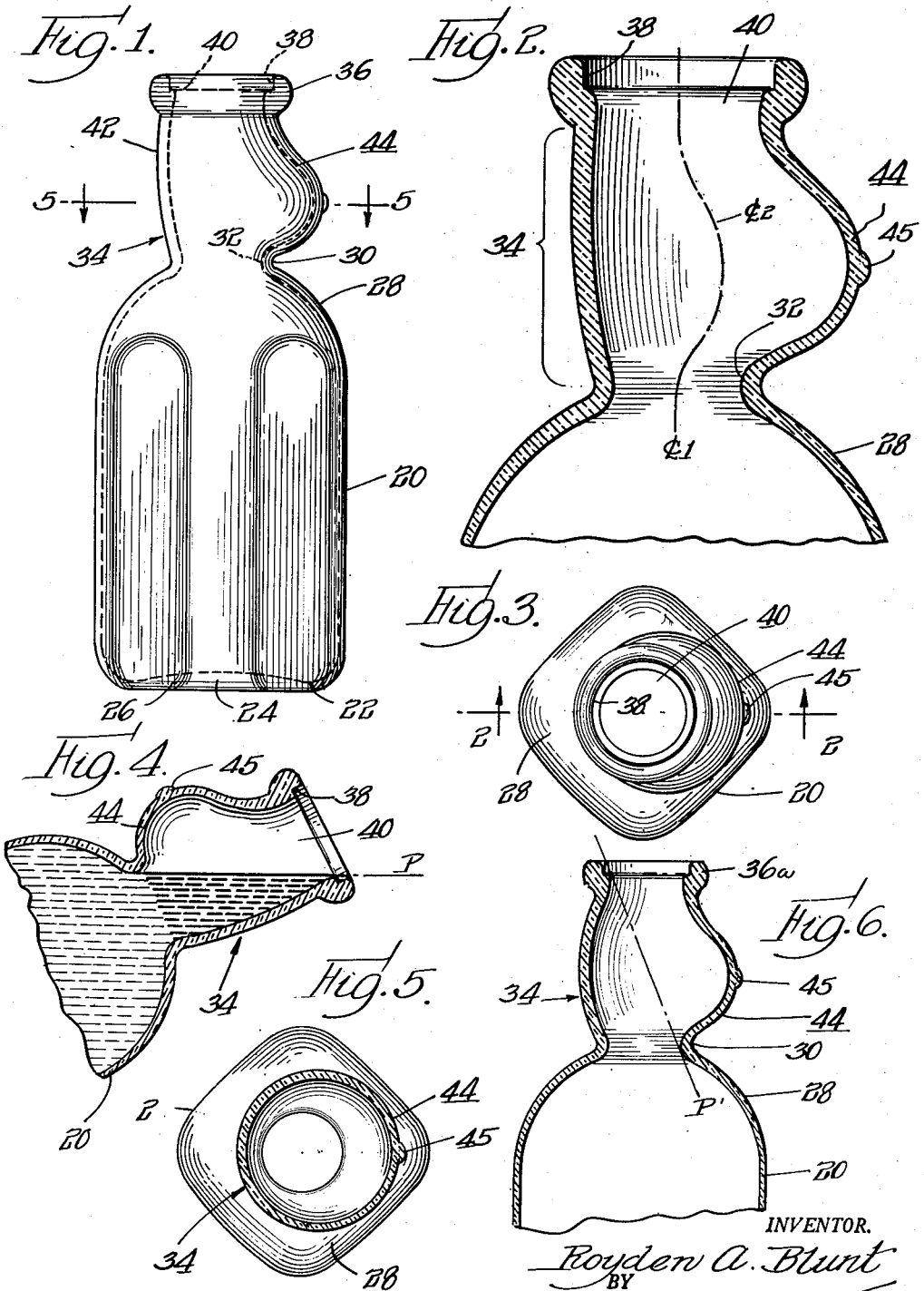
July 7, 1953 — R. A. BLUNT — 2,644,599
BOTTLE
Filed April 24, 1951 — 2 Sheets-Sheet 1
INVENTOR.
Royden A. Blunt
BY Moore, Olson & Trexler
attys.

Patented July 7, 1953

2,644,599

UNITED STATES PATENT OFFICE 2,644,599

BOTTLE

Royden A. Blunt, Baltimore, Md.

Application April 24, 1951, Serial No. 222,657

5 Claims. (Cl. 215—31)

The present invention relates to new and useful improvements in fluid containers and more particularly to such improvements in bottle type containers designed for holding mixtures of liquids of different densities which will separate to varying degrees upon standing.

Containers of the above type are used for holding such mixtures for transportation or storage and ultimate dispensing and an example of such a container is to be found in milk bottles for holding standard milk, as distinguished from homogenized milk. Thus, the standard milk is such a liquid having separable liquid components of different densities in that, upon standing, the milk will separate into a cream accumulation on top of a body of a thinner milk or skim milk. Standard type bottles, that is, those without a cream separating chamber, will show an accumulation of cream upon standing for a sufficient length of time but the pouring of cream of a high butterfat content from such bottles is extremely limited. So-called cream chamber type bottles are those which include a bulb-like cream chamber wall which is concentric with respect to the longitudinal center axis of the bottle and the dispensing of the accumulated cream from such bottles is substantially better than the dispensing of cream from standard type bottles. However, with cream chamber type bottles, the bulbous cream chamber, particularly with the larger finishes, is designed for use with a mechanical cream separator or valve structure which is intended to permit pouring of the cream without any intermingling of milk therewith.

It is desirable to effect this improved cream pouring without substantial intermingling and without the use of any mechanical separator or valve structure and, to this end, one of the principal objects of this invention is to provide a cream chamber type of bottle which is constructed and arranged to improve materially the cream pouring characteristics thereof, both as to volume and percentage of butterfat.

Another object of the invention is to provide a bottle substantially of the above type wherein practically the entire volumetric content of the cream chamber can be dispensed with a minimum intermingling of milk with the cream therein so that a relatively high and consistent butterfat content of the poured cream is obtained.

A further object of the invention is to provide a cream chamber type of bottle wherein the cream chamber wall is offset, eccentric, or asymmetric, with respect to the central longitudinal axis of the bottle and from which the improved cream pouring characteristics are obtained by pouring with the portion of maximum eccentricity or that part more remote from the center line of the bottle held uppermost during tilting of the bottle.

A still further object of the invention is to provide a bottle substantially of the above type wherein the eccentricity of the cream chamber wall can be increased or decreased to predetermine the percentage of butterfat content of the cream which can be poured from a given volume and richness of milk.

A still further object of the invention is to provide a cream chamber type of bottle substantially of the above type wherein the pouring opening and the reduced throat are substantially concentric with respect to the longitudinal center axis of the bottle but with the cream chamber wall between these two openings being eccentric therebetween with respect to the longitudinal center axis of the bottle.

The invention still further aims to provide a cream chamber type of bottle substantially of the type referred to above wherein the bottle will conveniently fit conventional bottle handling machinery such as washing, capping and like machines.

The above and other objects of the invention will in part be obvious and will hereinafter be more fully pointed out.

In the accompanying drawings:

Figure 1 is a side elevation of a cream chamber type of bottle made in accordance with the present invention and having a 56 mm. finish;

Figure 2 is a fragmentary longitudinal section taken along the line 2—2 of Figure 3 and showing the cream chamber in section;

Figure 3 is a top plan view of Figure 1;

Figure 4 is a fragmentary section similar to Figure 2 but showing the inclination of the bottle during cream pouring;

Figure 5 is a sectional view taken along the line 5—5 of Figure 1;

Figure 6 is a fragmentary view similar to Figure 2 but showing a smaller finish such as a 48 mm. finish;

Figures 7–11 are views each respectively corresponding to Figures 1–5 but showing the invention incorporated in a cream chamber type of bottle having one of the smaller finishes, such as a 38 mm. finish with sanitary grip.

Referring more in detail to the accompanying drawings and particularly to Figures 1–5, there is shown a quart bottle having a lower compartment or milk chamber 20 which is illustrated as being substantially squared by the inclusion of planar surfaces 22 joined by rounded corner surfaces 24. It is to be clearly understood, of course, that this lower chamber may be completely round or completely square or any other shape desired. The upper end portion of the body 20 is curved or otherwise inclined, as at 28, to merge into a restricted portion 30 which defines an inner throat opening 32. This throat opening is concentric with respect to the longitudinal center line CL1 of the bottle.

Above the throat opening 32 is the cream chamber 34 which terminates at the upper end thereof in a pressed finish 36. This finish 36 is to illustrate the relatively large 56 mm. finish which includes an inner cap seat 38 around the top pouring lip 40.

Between the throat opening 32 and the pouring opening 40 the cream chamber wall is offset with respect to the longitudinal center axis C of the bottle and, as illustrated, the cream chamber wall is centered along the line CL2. Thus, there is provided a slightly curved wall portion 42 at one side of the bottle axis CL1 and the opposite wall portion 44 is bulged outwardly not only with respect to the bottle axis but also along the line 5—5 of Figure 1. Along the line 5—5 of Figure 1, the cream chamber wall may be circular but, above and below such line, the cream chamber wall may be circular or noncircular and of decreasing eccentricity as such portions approach respectively the bottle finish 36 and the throat constriction 30.

As shown in Figure 4, pouring of cream accumulated in the cream chamber 34 is to be accomplished by holding uppermost the portion of the cream chamber wall 44 of maximum eccentricity and for this purpose an indicating projection or other indicator 45 may be provided, such projection being located so that the maximum eccentricity or offset of the cream chamber wall is uppermost and centered during pouring. Pouring is effected along the line P as shown in Figure 4, so that substantially the entire cream content above this line and within the eccentric cream chamber wall can be dispensed without intermingling of milk therewith.

In Figure 6, there is shown a similar type of bottle but with a smaller 48 mm. finish 36a and the line P' through the pouring opening indicates the amount of cream which can be poured substantially wtihout intermingling of milk therewith. Otherwise, this bottle is similar to that shown in Figures 1 to 5.

A modified form of bottle is shown in Figures 7-11 to which reference is now made. This form of bottle includes a body portion 50 which may be round or squared, as illustrated, by the provision of planar sides 52 joining one another through rounded corner portions 54. The top of the body portion 50 is directed inwardly along the curved surface 56 to a constricted portion 58 defining a reduced inner throat opening 57 which is concentric with respect to the longitudinal center axis of the bottle. Upwardly of the throat constriction 58, there is provided a cream chamber generally designated by the numeral 60.

The cream chamber portion includes a slightly reduced portion 62 concentric with the longitudinal center axis of the bottle and this reduced portion 62 merges into an outwardly and upwardly flaring portion 64 which terminates at a predimensioned peripheral guiding surface 66. There is an inwardly and upwardly inclined shoulder portion 68 merging into the finish 70 around the pouring opening 72. The guiding surface 66 is a blown surface forming during blowing of the bottle below the finish which may be pressed and functions as a guiding, centering and locating means for the bottle in bottle handling machinery, such as in washing, filling, capping machines and the like. The inclined surface 64 below the guiding surface serves as a convenient and sanitary finger gripping surface to facilitate the manual handling of the bottle, this being particularly desirable in bottles having a small finish, such as the 38 mm. finish of the illustrated bottle, which may also be provided with a pouring indicator, such as 45.

Between the constricted portions 58, 62, the cream chamber wall is offset with respect to the longitudinal center axis of the bottle and, as illustrated, the cream chamber wall is eccentric with respect thereto. There is thus provided a slightly curved wall portion 74 at one side of the bottle axis and an opposite outwardly bulged wall portion 76. The eccentrically positioned cream chamber wall may be circular along the line 11—11 of Figure 7 and may be circular or noncircular and of decreasing eccentricity as the wall approaches the reduced portions 58, 62.

In the forms of bottles illustrated herein, the particular shaping of the eccentric cream chamber wall may vary but generally the enlarged bulbous portion is eccentrically offset relative to the longitudinal center axis of the bottle and pouring for cream separation is to be accomplished with this bulbous portion disposed uppermost. The cream chamber wall is itself asymmetrical when considered with respect to the vertical center line of the bottle, although selected transverse segments thereof on opposite sides of the transverse center plane may be symmetrical with respect to one another. There is thus provided a bottle with an offset cream chamber, that is, offset with respect to the longitudinal center axis of the bottle, so that, when pouring with the wall surface of maximum offset uppermost, the volumetric capacity of that part of the cream chamber above the pouring line will be greater than the capacity therebelow. This assures a maximum separation of cream without intermingling of milk at least up to the angle of pouring where the first bubbles will pass through the throat opening into the lower milk chamber. In effect, the cream chamber is lopsided in that this chamber has a larger volume on one side of a plane along the center line of the bottle than on the opposite side of this same plane. In other words, at least one portion of the cream chamber wall is farther away from the center line of the bottle in one direction than an opposite portion is in the opposite direction.

In general, milk in conventional cream chamber bottles of various sizes having the same butterfat content and having stood for the same length of time, and the cream chamber of the various conventional bottles being of substantially the same capacity, the butterfat percentage, for equal volumes of milk poured from the various conventional bottles, is directly dependent upon the size of the finish opening of the bottle and varies inversely with the size of the throat opening. Theoretically, a conventional cream chamber type of bottle having a finish opening of infinite size and an infinitesimal throat opening would pour all of the contents of the cream chamber, without any intermingling of the skim milk in the lower chamber with the cream in the cream chamber. In practice, the throat opening must be large enough to permit efficient washing and filling of the bottle, and the finish opening must be small enough to allow economical capping of the bottle. A bottle having, in accordance with the present invention, an eccentric or lopsided cream chamber and a throat opening meeting the above limitation, permits the pouring of a richer cream than is possible with a conventional cream chamber type of bottle of the same or larger finish opening.

It will be appreciated that the bottles made in accordance with the present invention not only serve to increase the richness of cream which can be poured from the cream chambers thereof but also provide an average richer cream even when emptying substantially the entire volumetric capacity of the cream chambers. The eccentricity of the cream chambers makes this possible by delaying the intermingling of milk with the cream in that the larger volumetric capacity of the cream chamber above the pouring line can be discharged prior to the bubbling of air through the reduced throat opening into the lower milk chamber.

The eccentricity of the bottle may be varied and this is an important consideration in the method of making the bottles so as to predetermine the approximate or desired percentage of butterfat in cream to be poured from a given volume of milk of known butterfat content. Generally speaking, the eccentricity of the cream chamber will be increased as the pouring openings are decreased. Thus, where a one-eighth inch off center eccentricity may be satisfactory, depending on the quality and quantity of cream ultimately desired, in a 48 mm. finish, a bottle with a 38 mm. finish might require a one-quarter inch off center eccentricity to have the same predetermined cream pouring characteristics. In other words, from a given quantity of milk of known butterfat content, and bearing in mind the average length of time and temperature at which the milk will stand for cream accumulation in the cream chamber, the eccentricity of the cream chamber wall may be predetermined for the desired butterfat content of the cream to be poured in emptying the entire cream chamber or in partially emptying the cream chamber for cream of higher butterfat content.

It is to be also noted that while the bottle is made according to the "press and blow" method, the finish is the only pressed portion and the entire remaining portion of the bottle is blown. Even when a blown centering or guide surface is incorporated in the bottle, such as at 66 in Figures 7 and 8, and variation in the desired cream pouring characteristics may be compensated by varying the eccentricity of the cream chamber wall therebelow. There are no sharp interior corners so the bottle can be washed in conventional machines and, similarly, there are no sharp corners or internal surfaces which will not drain properly.

Certain comparative tests have been made utilizing standard pasteurized milk with 4 per cent butterfat content and standing at 42° F. for 24 hours. As brief illustrations of results of such comparative tests conducted by a commercial laboratory employing accepted and standard testing and pouring techniques, it was determined that the butterfat content poured from 38 mm., 48 mm. and 56 mm. eccentric cream chamber bottles of the present invention is markedly higher than that poured from standard cream chamber bottles with the same sizes of finish. For example, 3½ ounces poured from a 48 mm. eccentric type bottle had butterfat content of 24.0%, whereas the same amount of cream poured from a conventional 48 mm. cream chamber type of bottle had a butter content of only about 19.5%; which constitutes an increase of 23% in butterfat content of cream poured from the eccentric type chamber. Likewise, in pouring the same amount of cream from a 56 mm. eccentric type bottle, the butterfat content was about 25.25%, whereas, the same amount poured from a standard 56 mm. cream chamber type of bottle was only about 22.0% but showing an approximately 14% increase with the eccentric type cream chamber. Generally speaking, cream containing a butterfat content of about 22 per cent and above can be whipped, depending, of course, upon considerations of temperature, the type of utensil used, and the like. As illustrative it was determined that four ounces of cream poured from a 56 mm. eccentric type bottle had a butterfat content of about 22.0%, whereas, the same amount of cream poured from a 56 mm. conventional cream chamber bottle had only about 20.25% butterfat content. Likewise, four ounces poured from a 48 mm. eccentric type bottle contained about 21.75% butterfat content, whereas, the same amount poured from a conventional 48 mm. cream chamber type bottle had only about 18.25% butterfat content. To pour cream with at least 22 per cent butterfat content from a 56 mm. conventional cream chamber bottle, only about 3½ ounces can be poured and from a 48 mm. conventional cream chamber type bottle only about 2¾ ounces can be poured. This generally confirms the fact that conventional bottles of larger finishes are generally superior in pouring off richer cream because of the relation between the relatively small throat opening between the upper and lower chambers and the relatively large pouring opening provided in the large finish bottles. However, the cost of the closure or cap material in the larger finish bottles is quite high as compared to that for the bottles of a smaller finish such as a 38 mm. finish bottle and comparable improved pouring characteristics were established in the 38 mm. eccentric type bottle over the 38 mm. conventional cream chamber type bottle.

From the foregoing description, the novel structural and resultant functional characteristics of a bottle made in accordance with the present invention will be appreciated and, while certain forms of the invention have been shown for purposes of illustration, it is to be clearly understood that various changes in the details of construction and arrangement of parts may be accomplished without departing from the scope of the invention as set forth in the appended claims.

I claim:

1. A container for liquids having separable components of different densities, and comprising a main compartment substantially symmetrical about a vertical axis and terminating in a substantially circular reduced throat also substantially symmetrical about said vertical axis, an upper bulbous compartment above said reduced throat and terminating in a substantially circular pouring opening relatively smaller than the maximum transverse extent of said bulbous compartment and also substantially symmetrical about said vertical axis, the inner wall surface of said bulbous compartment being substantially circular and substantially eccentric with respect to said vertical axis of symmetry of said main compartment to effect pouring of a highly concentrated component from the upper compartment when the container is tilted for pouring with the wall portion of maximum spacing from the vertical axis disposed uppermost.

2. A container as claimed in claim 1, wherein the bulbous compartment merges into a concentric guiding surface below the pouring opening to facilitate machine handling of the container.

3. A container as claimed in claim 2, wherein there is provided an inwardly and downwardly inclined sanitary finger gripping surface between the top of the bulbous compartment and the guiding surface.

4. A container as claimed in claim 1, wherein there is provided an inwardly and downwardly inclined sanitary finger gripping surface between the top of the bulbous compartment and the pouring opening.

5. A container as claimed in claim 1, wherein the bulbous compartment is provided with a visible indicating element to facilitate positioning the bottle for pouring.

ROYDEN A. BLUNT.

References Cited in the file of this patent

UNITED STATES PATENTS

| Number | Name | Date |
|---|---|---|
| D. 146,525 | Scheemaeker | Mar. 25, 1947 |
| 1,528,480 | Henderson | Mar. 3, 1925 |
| 1,722,396 | Reiber | July 30, 1926 |
| 1,770,093 | West | July 8, 1930 |
| 1,835,252 | West | Dec. 8, 1931 |
| 2,239,092 | Gammill | Apr. 22, 1941 |
| 2,344,485 | Adams | Mar. 21, 1944 |

FOREIGN PATENTS

| Number | Country | Date |
|---|---|---|
| 506,706 | Great Britain | June 2, 1939 |